United States Patent [19]

Carlsson et al.

[11] Patent Number: 5,167,832
[45] Date of Patent: Dec. 1, 1992

[54] METHOD FOR DEWATERING PARTICLE COLLECTIONS CONTROLLED BY MONITORING CHANGING MASS

[75] Inventors: Mats Carlsson, Morgongåva, Sweden; Torbjörn Jönsson, Sala; Per-Erik Sandgren, Sala; Hans-Göran Hedlund, Sala, all of Sweden

[73] Assignee: Sala International AB, Sala, Sweden

[21] Appl. No.: 642,420

[22] Filed: Jan. 17, 1991

[30] Foreign Application Priority Data

Feb. 22, 1990 [SE] Sweden ............................ 9000623

[51] Int. Cl.$^5$ .................. B01D 21/30; G01G 13/24
[52] U.S. Cl. ........................ 210/739; 100/37; 100/45; 100/99; 177/1; 177/245; 210/741; 210/770; 364/568
[58] Field of Search ............... 210/138, 739, 741, 770, 210/143, 224, 225, 230; 177/1, 25.14, 165, 208, 245; 364/567, 568; 100/43, 45, 50, 99, 37; 73/76, 433–436

[56] References Cited

U.S. PATENT DOCUMENTS

| | | | |
|---|---|---|---|
| 4,439,325 | 3/1984 | Blais | 210/741 |
| 4,639,312 | 1/1987 | Quock et al. | 210/224 |
| 4,749,054 | 6/1988 | Virtanen et al. | 177/1 |
| 4,889,201 | 12/1989 | Oldendorf et al. | 364/568 |
| 4,900,454 | 2/1990 | Hedlund et al. | 210/770 |
| 4,986,008 | 1/1991 | Falk | 34/51 |

Primary Examiner—Robert A. Dawson
Assistant Examiner—Joseph Drodge
Attorney, Agent, or Firm—Burns, Doane, Swecker & Mathis

[57] ABSTRACT

The invention relates to a method for dewatering particle collections with the aid of a filter press in a cyclic sequence comprising filling, dewatering and emptying stages. The various stages within each cycle and between consecutive cycles are followed-up and determined by measuring continuously a magnitude which varies with the mass of the press and its contents, preferably the pressure exerted by the press and its contents on the surface supporting the press.

9 Claims, 1 Drawing Sheet

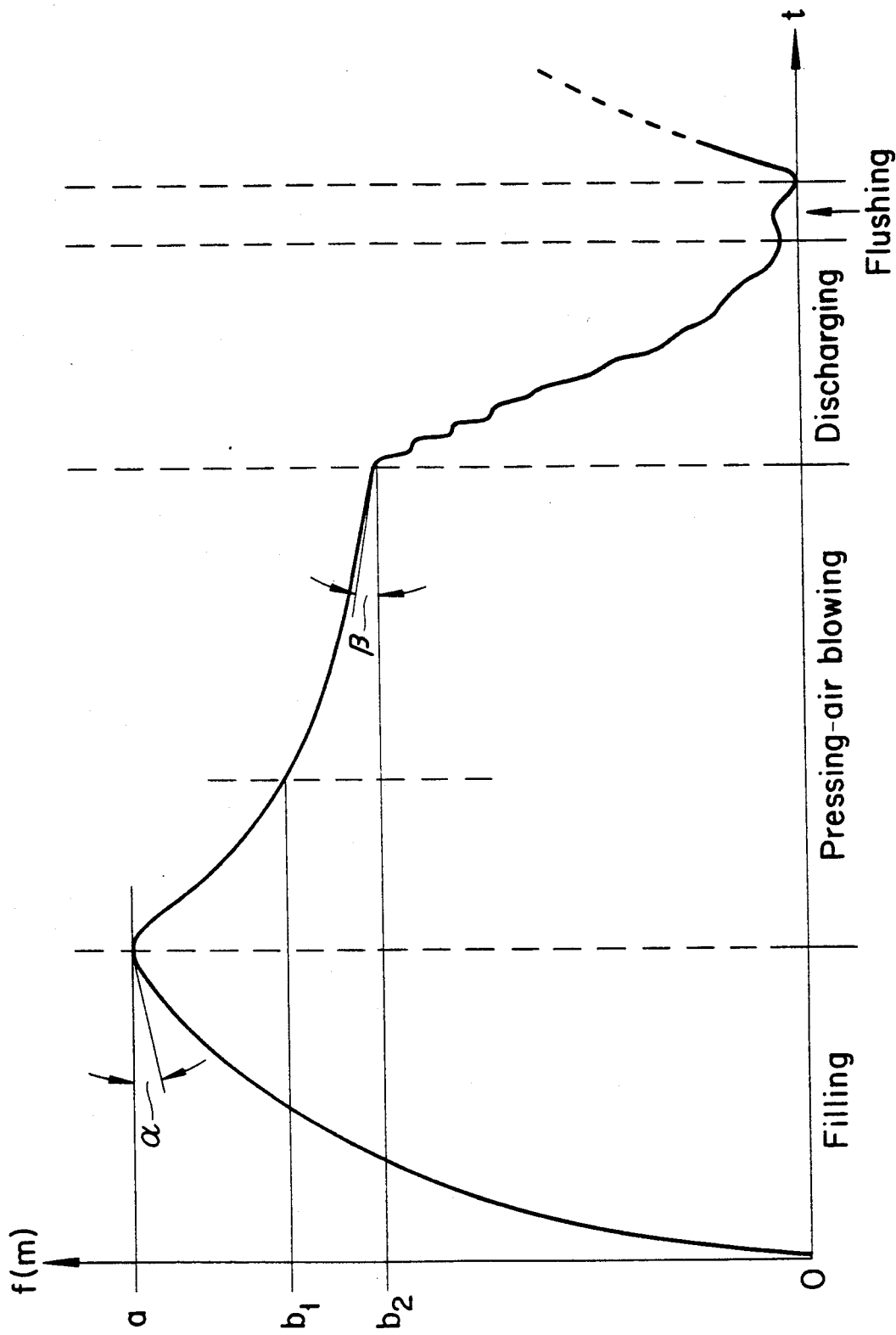

METHOD FOR DEWATERING PARTICLE COLLECTIONS CONTROLLED BY MONITORING CHANGING MASS

The present invention relates to a method for dewatering particle collections in a cyclic sequence with the aid of a filter press, said sequence comprising the stages of filling, dewatering and emptying the press.

Water-containing particle collections, such as mineral suspensions and fibre suspensions, are often dewatered with the aid of a filter press, as indicated in the preamble.

Problems are encountered when dewatering particle collections in a filter press, partly because of the difficulties of determining and following-up the amount of product to be dewatered that is charged to the press and partly with respect to optimizing the method and the various stages thereof. This is mainly because filter presses operate periodically or cyclically, as also indicated in the preamble. Thus, such methods usually comprise three stages. During the first stage, the filter is filled at the same time as filtering is effected on the filter cloth while forming a moist filter cake of particles on the cloth in the press. Subsequent to filling the filter in this way, the supply of particle collection to be dewatered is interrupted. During the second stage, the filter cake formed during the first stage is dewatered still further, to the desired water content. This second stage may consist of several part stages, normally mechanical pressing and air blowing. The third stage is then carried out, the emptying stage, which may also comprise several part stages. The dried material is then transported to a downstream station, normally with the aid of a conveyor belt. In addition to the aforesaid three main method stages, there is normally a last stage, the rinsing stage, in which the filter cloths are rinsed or washed with liquid in order to rinse off any filter cake residues that are present and also for washing and cleaning purposes One common method of measuring the quantity of material dewatered involves the use of a belt scales, although such use is not totally idealistic, due to the periodic working cycles of the press filter. Consequently, it has been proposed in U.S. Pat. No. 4,749,054 that the weight of each charge of dewatered material is determined by weighing the filter with dewatered product and, subsequent to emptying the filter, weighing the empty filter and calculating the difference between the two weighings. Although this known method may possibly solve one of the two problems associated with dewatering in press filters, namely the problem of determining the quantity of product dewatered in each cycle, the problem associated with optimizing the method in its entirety remains in principle, even though a certain degree of discontinuous follow-up with feed-back is made possible.

In general, present day dewatering methods are controlled either by time-controlling the process stages or by quite simply controlling the various stages manually. The disadvantages with this are obvious, namely that all possible process disturbances will affect the dewatering process negatively, and energy consumption becomes unnecessarily high, because the process has not been optimized.

Because of increasing energy costs and the progressively increasing industrial requirements on the dewatering of particle suspensions, demands have been made on further development of the dewatering methods so that they do not prohibit the handling of these materials from an energy aspect At present it is considered that the energy costs are a very important factor in the total dewatering costs. Thus, there is an express desire for particle collection dewatering methods which will fulfill the requirements of low energy consumption and/or higher productivity.

One method of endeavouring to optimize such methods is to improve the actual dewatering stage itself. One such method is described in our earlier patent specification SE-A-8802110-0 (and corresponding European EP-A-346312), in which the blowing stage of the dewatering process is effected in conjunction with following-up the pressure of the blowing air, so as to enable dewatering to be effected in one single part stage—penetration—instead of the three stages—penetration, draining and evaporation respectively—which would otherwise be used. Another method of endeavouring to optimize the dewatering methods is one of providing more sophisticated apparatus, therewith enabling dewatering to be effected with the least possible disturbance. A modern, advanced filter press which, among other things, provides an improved emptying operation, is described in our earlier patent specification SE-B-453 726.

The present invention provides a method which will enable the entire dewatering process to be followed-up and controlled in a simple and effective manner so as to enable all process stages to be optimized, which means, among other things, that all stages can be initiated and terminated during the process at the most suitable occasion from the process aspect. Furthermore, each tendency of disturbance is indicated, for instance, disturbances caused by material supply, blocking of the filter or incomplete emptying thereof.

The invention is by the steps set forth in the following discussion.

Thus, when practising the present invention the various stages are followed-up within each cycle and between consecutive cycles, by continuously measuring a magnitude which varies with the mass of the press and the press contents. By "mass of the press" shall be understood throughout as including the mass of at least that part or parts of the press utilized for the actual dewatering process. Naturally, the mass can also concern the whole of the press, including the press stand, and components and devices of a more secondary nature to the inventive method. In this regard, the expression "followed-up and determined" include the continuous registration of relevant data for producing relevant curves and optionally also direct entering of such measuring values into a data processor. Furthermore, reference to controlling the method implies, for instance, initiation and termination of part method steps at predetermined measurement values or when the operational curves produced have given slopes or show a breakdown tendency, as will be explained in more detail below with reference to examples of operational curves.

The magnitude selected for following-up changes in the mass during the dewatering sequence may take many different forms and may, for instance, comprise the weight of the press, including its content, in those instances when the press is completely or partially supported by a weighing device, or the stretch which press exerts on a stay or brace or the like, which lifts the press completely or partially. It is preferred, however, to utilize the pressure exerted by the mass of the press and its content onto the surface supporting the press.

The pressure measured may be the total pressure acting on the press supporting surface, although it is more suitable to measure a pressure which is a function of the total pressure. The pressure is preferably measured and followed-up by sensors placed between the press support surface and the press itself. According to one preferred method, the pressure exerted by the mass of the press and its contents is measured solely on one side of a symmetry line drawn through the longitudinal axis of the press. The press may be freely mounted or resiliently mounted on the other side of the symmetry line. In this case, the pressure between the press supporting surface and one or more legs or press supports is measured.

The invention will now be described in more detail with reference to the accompanying drawing, the single FIGURE of which illustrates an example of curves illustrating the progress of the dewatering process achieved in accordance with the invention.

The vertical axis of the illustrated curve represents a magnitude f(m) which is a function of the mass m of a filter press and its content, whereas the horizontal axis represents time, the curves also illustrating the propagation of the various part steps during a process cycle.

The filling stage is introduced with the press emptied of material, wherein the magnitude f(m) can be set to zero. As the filter is filled with water-containing particle collection, for instance mineral suspension, the total mass will increase and the magnitude f(m) will also increase along a curve having a successively lowering growth gradient which at f(m)=a has assumed a value which can be expressed with an angle α corresponding to the predetermined value of the filling gradient at which the filling stage shall be terminated. This value α is determined suitably empirically, i.e. on the basis of experience, for each type of filter and particle collection concerned, for instance with respect to filling volume, productivity achieved or the properties of the dewatered material.

Thus, filling is terminated at f(m)=a and the actual dewatering stage is introduced with pressing of the material, in which water is mechanically pressed through the filter cloths of the press. Indicated in the drawing is a value $b_1$ for the magnitude f(m) at which pressing can suitably be terminated and blowing introduced.

During the pressing and blowing process, f(m) falls along a curve having a progressively decreasing inclination gradient, at least towards the end. When a predetermined inclination gradient, here expressed as an angle B, is measured at f(m)=$b_2$, the through-blowing of air is interrupted, and therewith the whole of the dewatering stage is terminated. The magnitude f(m) will rapidly decrease during the emptying phase, often sporadically as indicated in the drawing, due to the fact that a larger part of the filter cake falls from the filter due to vibration of the cloth, whereas the curve becomes somewhat flatter towards the end of the emptying phase. When the curve has reached the value "zero" or at least a value in the vicinity of zero, emptying is terminated The next part stage, rinsing, is commenced with the intention of rinsing away any remaining dewatered filter cake from the filter cloths, and also with the intention of cleaning and washing the cloths as thoroughly as possible, so that the cloths can be reused as effectively as possible, for dewatering in the following cycle, In the rinsing phase, the mass will at first increase slightly, as evident from the drawing, due to the mass of wash liquid in the supply pipes and conduits in the press, whereas the mass will again fall when the supply of wash liquid is interrupted. When the curve has reached the value "zero" and the press is thus empty and clean, a new dewatering cycle is commenced with the filling phase, as indicated in the drawing.

It will be evident from the aforegoing that the process can be controlled readily on the basis of process curves similar to the curve illustrated in the drawing, and that all process steps can therewith be controlled by automatic devices with the aid of a data processor to which all measurement data is supplied continuously. It also lies within the scope of the present invention to utilize the measured magnitude in other ways for following-up and controlling the dewatering method.

We claim:

1. A method of cyclically dewatering a particle collection in a filter press wherein each cycle comprises the steps of:
   a) filling the filter press with a water-containing particle collection;
   b) dewatering the water-containing particle collection so as to collect particles on a filter in the filter press; and
   c) emptying collected particles from the filter press, wherein a value based on the mass of the filter press and the contents thereof varies over time and is continuously determined throughout each cycle and each step of steps a)-c) is initiated and terminated at respective times based on said value.

2. The method of claim 1 wherein the filter press is on a supporting surface and the value is determined by measuring pressure exerted on the supporting surface by the filter press.

3. The method of claim 1 wherein the value is determined based on the total mass of the filter press and the contents thereof.

4. The method of claim 3 wherein the filter press is on a supporting surface and the value is determined by means of sensors placed between the filter press and the supporting surface.

5. The method of claim 1 wherein the filter press is on a supporting surface and the value is determined by means of sensors placed between the filter press and the supporting surface.

6. The method of claim 1 wherein the filter press has a line of symmetry through a longitudinal axis of the filter press and the value is determined by measuring pressure exerted by the mass solely on one side of the line of symmetry.

7. The method of claim 6 wherein the filter press has a plurality of supports located on a supporting surface and pressure is measured between at least one of said supports and the press supporting surface.

8. The method of claim 1 wherein the value is the stretch exerted by the filter press on a stay or brace which at least partially lifts the filter press.

9. The method of claim 1 wherein all measurement data obtained from the determination is supplied to a data processor in order to control all process steps automatically.

* * * * *